Patented Mar. 5, 1935

1,993,289

UNITED STATES PATENT OFFICE 1,993,289

GELATIN FOOD PRODUCT AND METHOD OF PREPARING SAME

William E. Stokes, Brooklyn, and David F. Silver, Forest Hills, N. Y., assignors to Royal Baking Powder Company, New York, N. Y., a corporation of New Jersey No Drawing. Application February 18, 1933, Serial No. 657,460

14 Claims. (Cl. 99—11)

This invention relates to food products and to a method for the preparation thereof. More particularly, it relates to gelatin food products in which are thoroughly and effectively incorporated palatable ingredients and includes correlated discoveries and improvements whereby the desired qualities of such food products are enhanced.

It has for a general object the provision of an efficient and practicable method of readily and thoroughly incorporating palatable ingredients with a gelatin substance and the food product obtained through the practice thereof which has improved qualities and retentivity of flavor.

Further objects of the invention are the preparation of a food product of excellent flavor and keeping qualities by the admixture of palatable ingredient, such as a flavoring substance, in a foamy condition with a gelatin substance which absorbs and retains the palatable ingredient in staple form, and the provision of a method for the production of such products.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure. The scope of the invention will be indicated in the claims.

The preparation of gelatin products in a substantially ganular free-flowing condition with an added palatable ingredient, such as a flavoring substance, an edible acid, etc., is well known. As heretofore practiced, such products possess characteristics making their preparation for consumption difficult, have poor keeping qualities, are low in palatable ingredient content and non-uniform in composition. Many palatable ingredients, as liquid flavors, for example fruit juices and flavor concentrates, when reduced to a dry state will ordinarily retain only a small part of the flavoring principles with a resultant change in the characteristic odor and taste. When admixed with gelatin the resultant food product is non-uniform in character and of poor keeping qualities. Further when masses of granular gelatin are added to a solution of the palatable ingredient, there is a tendency for the gelatin particles to adhere and form balls or lumps. This results in an unequal distribution of the ingredient due to a low degree of penetration into the lumps of gelatin and also necessitates breaking up the resultant lumps in order to form a free-flowing granular food product.

In accordance with the present invention gelatin food products are prepared by a method which overcomes the difficulties of the prior procedures and a food product is obtained having improved keeping and flavoring qualities and characteristics.

In practise a foam is formed from a solution containing a palatable ingredient and a gelatin substance is admixed therewith. The foam condition gives a liquid surface of about the same magnitude as the surface of the gelatin substance and the particles of the gelatin substance are kept dispersed to prevent formation of lumps, allowing a thorough absorption of the palatable ingredients by the particles of the gelatin substance which then serve to prevent deteriorating contact between the palatable ingredients or flavoring substance and the surrounding atmosphere.

The foam is formed by passing an inert gaseous material such as air, carbon dioxide, nitrogen, etc., through a solution of the palatable ingredient. In the preferred form the formation of the foam is accomplished by the use of any suitable carbonate, for example, sodium carbonate, sodium bicarbonate, potassium carbonate, potassium bicarbonate, etc., with an acidulated solution of the selected palatable ingredients. The normal acidity of fruit juice flavors may be relied on or the solution of palatable ingredient may be provided with an adjusted acidity by the addition of a suitable acid, for example, when a fruit juice flavor solution is used tartaric acid, citric acid or malic acid, or acid salts thereof, may be added thereto.

To insure efficient absorption of the palatable ingredient by the particles of gelatin substance, the heat of absorption is carried away while the gelatin substance is being added to and mixed with the foam. This is preferably done by chilling the mass. After thorough mixture and time allowed for complete absorption, excess moisture is removed from the resultant product. For example, when a free-flowing granular food product is desired, the excess moisture is removed preferably by passing a stream of relatively dry warm gas, such as carbon dioxide or air, over the mass.

As an illustrative example of a manner in which the invention may be carried out, the following is presented:

To 22 parts by weight of juice, concentrated to about one-tenth of its original volume, are added 7 parts by weight of tartaric acid. The resultant solution is chilled to about −10° C. The chilled flavor is then poured over about 7 parts by weight of sodium bicarbonate in a brine jacketed mixer, for example that commercially known as the "Day ribbon type". The temperature of the brine is kept at about zero degrees F. The mixer is operated until it is well filled with flavor foam. About 64 parts by weight of granular gelatin are added to the foam and the whole thoroughly mixed. Air at about 100° F. and of a relative humidity of about 10 per cent is passed over the mixture while the mixing is continued until the resultant product has lost sufficient moisture to bring down its total ingredient weight to about 95 per cent of its original weight. The resultant food product is then discharged as a granular free-flowing food product and can be used in a gelatin dessert as the flavor and gelatin ingredients.

Carbon dioxide evolved during the formation of foam results in absorption by the cooled flavoring substance of a large volume thereof which, when the temperature is raised, is readily liberated. This assists in carrying moisture from the mixture. The use of carbon dioxide as a dehydrating gas also prevents tendencies of loss or change of flavor. The evolution of carbon dioxide disrupts the particles and results in the production of an even flowing mixture. According to the present invention a relatively dry, free-flowing, granular food product may be obtained in a relatively short time, for example about one hour as compared with the long drying period of the order of 24 hours of prior practices which also require grinding operations to break up formed lumps and masses of gelatin. Substances other than fruit juices and flavoring concentrates can be incorporated with the gelatin substance by the practice of the present method, for example, substances such as a sugar can be dissolved in water and added to the gelatin substance in a similar manner.

It will thus be seen that the present invention efficiently attains the objects set forth above and since certain changes may be made in carrying out the above process and certain modifications in the composition, which embody the invention, may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the sense permits.

Having described our invention, what we claim as new and desire to secure by Letters Patent, is:

1. A method of preparing a sensibly dry, granular, free-flowing food product which comprises incorporating a palatable ingredient with edible gelatin substance by forming a foam from a solution of a palatable ingredient and mixing a gelatin substance with the foam whereby the palatable ingredient is absorbed by the gelatin substance.

2. A method of preparing a sensibly dry, granular, free-flowing food product which comprises incorporating a palatable ingredient with edible gelatin substance by forming a foam from a solution of a palatable ingredient, mixing a gelatin substance with the foam whereby the palatable ingredient is absorbed by the gelatin substance, and removing excess moisture from the resultant product.

3. A method of preparing a food product which comprises incorporating a palatable ingredient with edible gelatin substance by forming a foam from a solution of a palatable ingredient, mixing a gelatin substance with the foam whereby the palatable ingredient is absorbed by the gelatin substance, and passing an inert gas of relatively low humidity over the resultant product to remove excess moisture therefrom.

4. A method of preparing a food product which comprises incorporating a palatable ingredient with edible gelatin substance by forming a foam from a solution of a palatable ingredient, mixing a gelatin substance with the foam whereby the palatable ingredient is absorbed by the gelatin substance while maintaining a relatively low temperature, and passing a stream of warm gas of relatively low humidity selected from the gases carbon dioxide and air over the resultant product to remove excess moisture therefrom.

5. A method of preparing a food product which comprises incorporating a palatable ingredient with edible gelatin substance by forming a foam from a solution of palatable ingredient by passing an inert gaseous material therethrough and mixing a gelatin substance with the foam whereby palatable ingredient is absorbed by the gelatin substance.

6. A method of preparing a food product which comprising incorporating a palatable ingredient with edible gelatin substance by incorporating a carbonate in an acidulated solution of palatable ingredient to form a foam, mixing gelatin substance with the foam whereby palatable ingredient is absorbed by the gelatin substance, and removing excess moisture from the resultant product.

7. A method of preparing a food product which comprises incorporating a palatable ingredient with edible gelatin substance by incorporating a carbonate in an acidulated solution of palatable ingredient to form a foam, mixing a gelatin substance with the foam while maintaining a relatively low temperature whereby the palatable ingredient is absorbed by the gelatin substance, and removing excess moisture from the resultant product.

8. A method of preparing a food product which comprises incorporating a palatable ingredient with edible gelatin substance by incorporating a carbonate in an acidulated solution of palatable ingredient to form a foam, mixing a gelatin substance with the foam whereby the palatable ingredient is absorbed by the gelatin substance, and passing a stream of warm, inert gas of relatively low humidity over the resultant product to remove excess moisture therefrom.

9. A method of preparing a food product which comprises incorporating a palatable ingredient with edible gelatin substance by mixing a carbonate in an acidulated solution of palatable ingredient to form a foam, mixing a gelatin substance with the foam while maintaining a relatively low temperature whereby the palatable ingredient is absorbed by the gelatin substance, and passing a stream of warm gas of relatively low humidity selected from the gases carbon dioxide and air over the resultant product to remove excess moisture therefrom.

10. A method of preparing a food product which comprises incorporating a fruit juice flavor with edible gelatin substance by incorporating a carbonate in a solution of fruit juice flavor of desired acidity to form a foam, mixing a gelatin substance with the foam whereby the fruit juice flavor is absorbed by the gelatin substance, and removing excess moisture therefrom.

11. A method of preparing a food product which comprises incorporating a palatable ingredient with edible gelatin substance by incorporating at a temperature of about zero degrees F. to 20° F. a carbonate in an acidulated solution of palatable ingredient to form a foam, mixing a gelatin substance with the foam while maintaining such relatively low temperature whereby the palatable ingredient is absorbed by the gelatin substance and passing a stream of inert gas of a temperature of about 100° F. and a relative humidity of about 10 per cent over the resultant product to remove excess moisture therefrom.

12. A granular, free-flowing food product comprising granular particles of a dried foam containing a mixture of gelatin and a palatable ingredient, the gelatin being permeated by the palatable ingredient.

13. A granular, free-flowing food product comprising a granular gelatin substance particles of which are permeated with a fruit juice flavor, said product comprising a dried residue of a mixture of granular gelatin with a foam comprising a fruit juice flavor.

14. In a method of preparing a sensibly dry, granular, free-flowing palatable ingredient with edible gelatin substance the step consisting in absorbing a palatable ingredient in a gelatin substance while the palatable ingredient is in the form of a foam.

WILLIAM E. STOKES.
DAVID F. SILVER.